(12) United States Patent
Born

(10) Patent No.: US 6,575,673 B2
(45) Date of Patent: Jun. 10, 2003

(54) ADVANCED AEROSPACE DRILL MOTOR

(75) Inventor: Glenn G. Born, Fort Worth, TX (US)

(73) Assignee: Lockheed Martin Corporation, Bethesda, MD (US)

(*) Notice: Subject to any disclaimer, the term of this patent is extended or adjusted under 35 U.S.C. 154(b) by 62 days.

(21) Appl. No.: 09/808,800

(22) Filed: Mar. 15, 2001

(65) Prior Publication Data

US 2002/0131833 A1 Sep. 19, 2002

Related U.S. Application Data

(60) Provisional application No. 60/231,488, filed on Jan. 29, 2001.

(51) Int. Cl.[7] .............................................. B23B 45/00
(52) U.S. Cl. ......................... 408/97; 408/111; 408/130
(58) Field of Search ......................... 408/130, 97, 129, 408/111, 10, 234

(56) References Cited

U.S. PATENT DOCUMENTS

| | | | |
|---|---|---|---|
| 1,999,248 A | | 4/1935 | Melling |
| 2,406,482 A | | 8/1946 | Tucker |
| 2,657,595 A | | 11/1953 | Shaff |
| 2,863,339 A | * | 12/1958 | Emrick .......................... 408/11 |
| 2,882,762 A | | 4/1959 | Stratman et al. |
| 2,977,826 A | * | 4/1961 | Radford ......................... 173/19 |
| 3,775,021 A | * | 11/1973 | Langebach .................... 408/17 |
| 4,025,218 A | | 5/1977 | Logan et al. |
| 4,818,154 A | * | 4/1989 | Bye et al. ....................... 33/833 |
| 5,016,335 A | * | 5/1991 | Becker et al. .................. 29/57 |
| 5,295,770 A | | 3/1994 | Pennison et al. |
| 6,099,213 A | | 8/2000 | Kammeraad et al. |

FOREIGN PATENT DOCUMENTS

| | | |
|---|---|---|
| FR | 933418 | 4/1948 |
| FR | 2779370 | 12/1999 |
| GB | 137757 | 1/1920 |

OTHER PUBLICATIONS

Cooper Power Tools "Buckeye, Doler & Gardner–Denver Equipment" p. 9.

Deschner Corporation of Santa Ana, California—Kinechecks "Constant Speed/Feed Control", 9 pages.

* cited by examiner

*Primary Examiner*—Daniel W. Howell
(74) *Attorney, Agent, or Firm*—Bracewell & Patterson, L.L.P.

(57) ABSTRACT

A method of drilling and a drill motor are provided for use with a stationary template attached to a material to be drilled. The drill motor has a frame having a handgrip and surrounding a movable carriage or motor assembly. The motor assembly contains an air-powered motor for rotating a drill bit. At least two air cylinders are located in the motor assembly on opposite sides of the drilling axis and are used to move the motor assembly within the frame. The force that can be applied to move the motor assembly is adjusted by adjusting the airflow to the cylinders. Hydraulic restrictions control the maximum speed at which the motor assembly moves. An auto-return valve and adjustable pin provide means for automatically returning the motor assembly to its rearward position once a desired drilling depth has been reached. Controls are provided at the grip for operating the feed system and manually retracting the motor assembly.

16 Claims, 4 Drawing Sheets

ADVANCED AEROSPACE DRILL MOTOR

CROSS REFERENCE TO RELATED APPLICATIONS

Benefit is herein claimed of the filing date under 35 USC §119 and/or §120 and CFR 1.78 to U.S. Provisional Patent Application Ser. No. 60/231,488, filed on Jan. 29, 2001, and entitled "Advanced Aerospace Drill Motor."

BACKGROUND OF THE INVENTION

1. Field of the Invention

This invention generally relates to drill motors and particularly relates to self-feeding drill motors used in aircraft manufacturing.

2. Description of the Prior Art

Aircraft manufacturing requires a high level of precision in drilling holes. A guide template having attachment points for a connector at the front of a drill motor is attached to the material to be drilled. A self-feeding drill motor has a feed mechanism for advancing a drill bit into the material while the drill stays attached to the template.

Typically, an air-powered drill motor is used. The typical advancing mechanism, though, is a mechanical system comprising a threaded collar or other positive-feed system for feeding the drill bit into the material at a given rate of spindle advancement. The feed rate is adjustable; however, the force between the bit and the material is usually not monitored or adjusted. As the cutting edges on the drill bit dull, the bit generates a greater amount of thrust as it is fed through the material. If the feed rate is not adjusted to compensate for the drill wear, more force is induced into the material. This force can cause problems in drilling the hole and result in unsatisfactory results, as the drill bit may break through the back side of the hole.

Another feed system uses air cylinders that are parallel to and eccentrically offset from the axis of rotation of the drill motor. The connector for the drill is on the forward end of a feed arm, which is releasably attached to the template. The drill motor is operated to rotate an attached drill bit, and the feeding mechanism is engaged to advance the drill bit into the material. The drill motor and bit move relative to the arm, template, and material.

Due to the offset of the feeding system, a moment can develop around the connection to the template that originates from the thrust between the drill bit and the material. This moment tends to bend the feed arm, causing the drill motor and bit to move out of alignment with the template. This may cause the bit to fail early or produce an unsatisfactory hole.

SUMMARY OF THE INVENTION

A method of drilling and drill motor are provided for use with a stationary template attached to a material to be drilled. The drill motor has a frame having a handgrip and within which a movable carriage or motor assembly is located. The motor assembly contains an air-powered motor for rotating a drill bit attached to the motor. At least two air cylinders are located in the motor assembly on opposite sides of the drilling axis and are used to move the motor assembly within the frame. The force that can be applied to move the motor assembly is adjusted by adjusting the airflow to the cylinders. Hydraulic restrictions control the maximum speed at which the motor assembly moves. An auto-return valve and adjustable clamp and rod provide a means for automatically returning the motor assembly to its rearward position once a desired drilling depth has been reached. User controls are provided at the grip for operating the feed system and for manually retracting the motor assembly.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

FIGS. 1 through 4 show a pneumatic drill having a system positioned around the motor for feeding the drill motor and a drill bit toward a material being drilled. The system provides for forces around the motor to be balanced, and this prevents a moment from being created.

Figure 1:
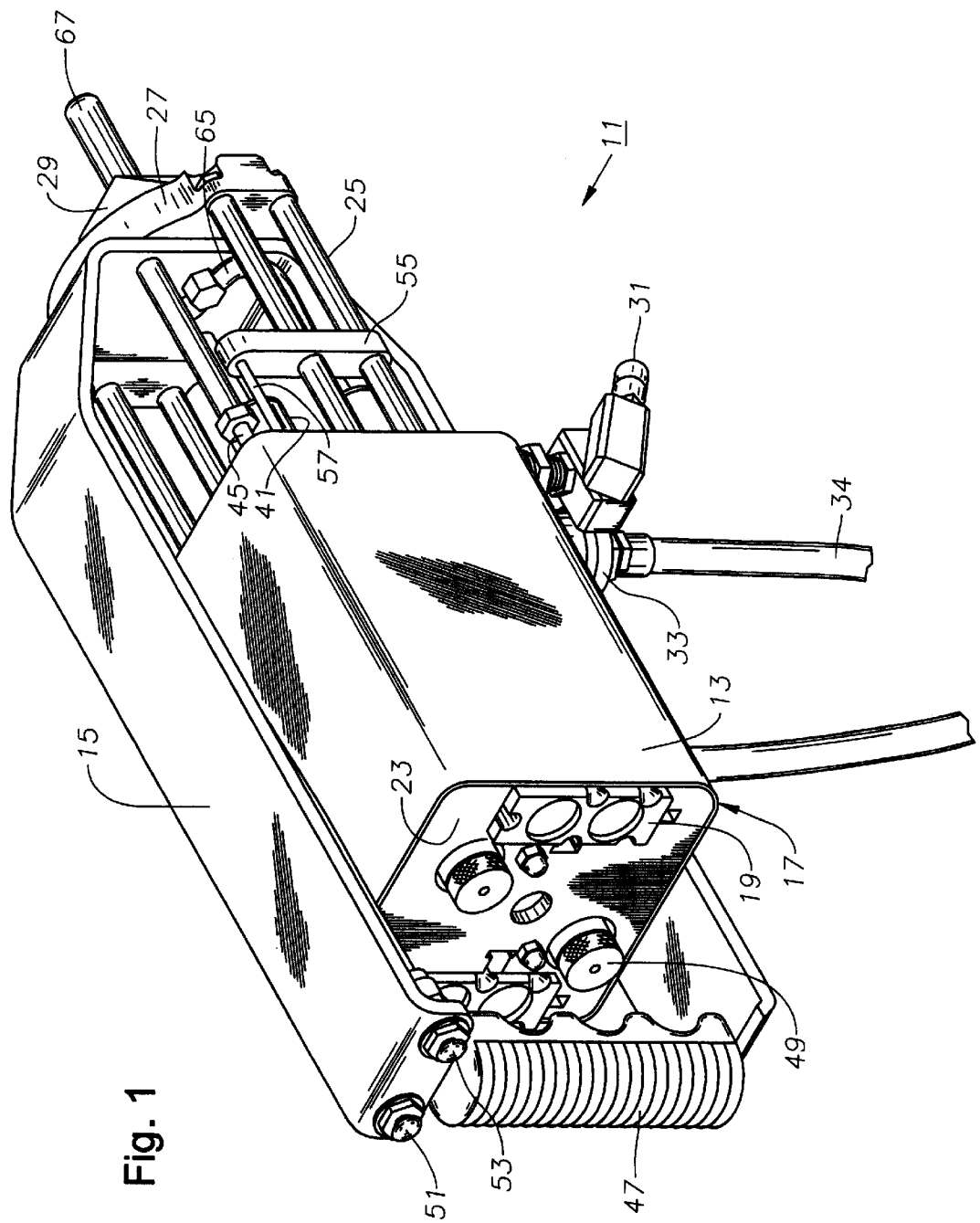
FIG. 1 is a rearward perspective view of a drill constructed in accordance with the present invention.
Figure 2:
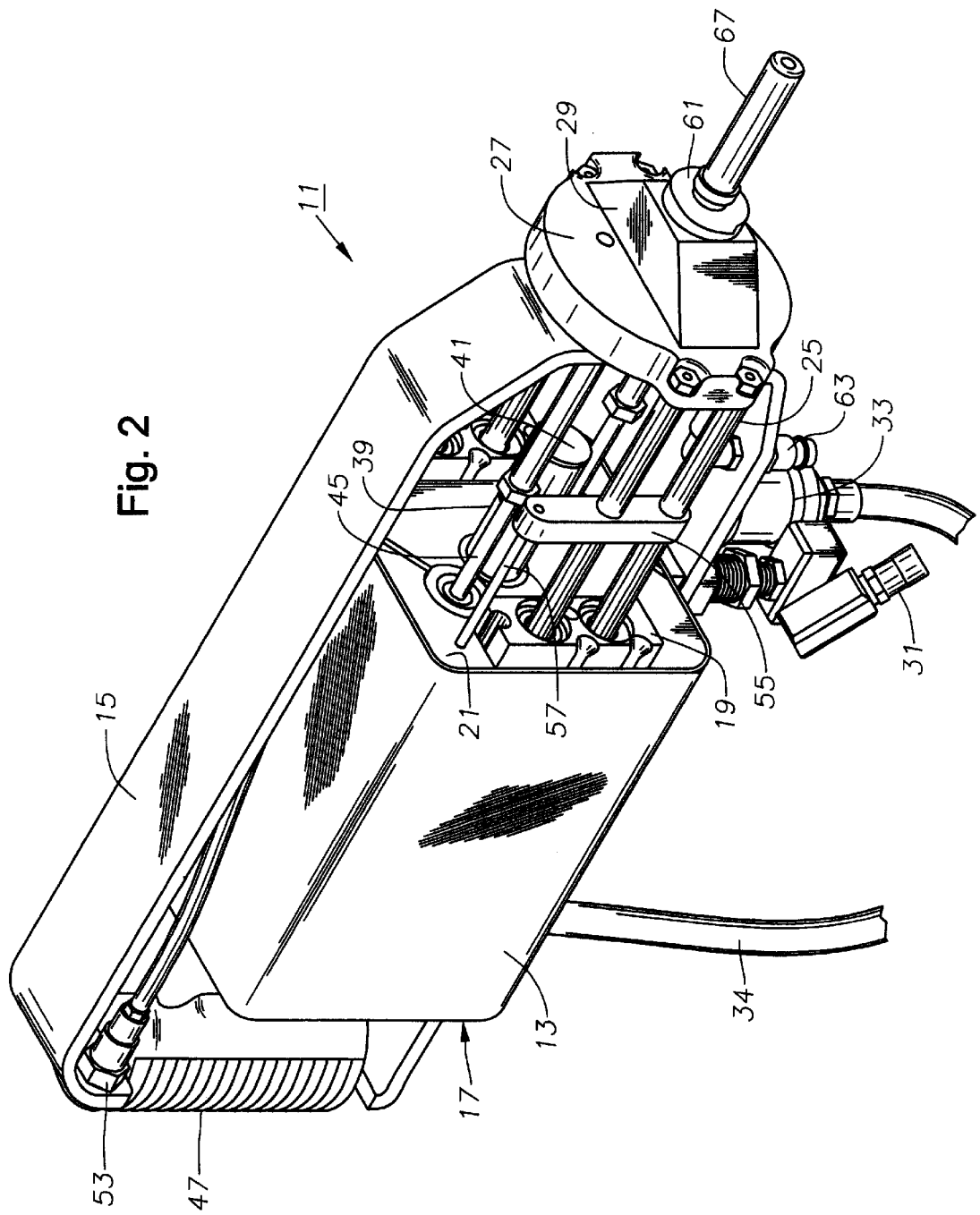
FIG. 2 is a forward perspective view of the drill of FIG. 1.

Referring to FIGS. 1 and 2, a drill 11 comprises a central motor and feed system within a housing 13 and a surrounding frame 15. Housing 13 is not in direct contact with frame 15 and can move longitudinally within frame 15. Housing 13 encloses a carriage carrying several components that are detailed in FIGS. 3 and 4, and these collectively comprise a motor assembly 17. As shown in these figures, a twin-rod air cylinder 19 connects each side of a front attach block 21 with a corresponding side of a rear attach block 23. Each cylinder 19 comprises a housing and two internal pistons, each piston being connected to a rod 25. Rods 25 extend through and beyond the forward surface of cylinders 19. Referring again to FIGS. 1 and 2, the forward ends of rods 25 are rigidly attached at their forward end to a nosepiece attach block 27. Nosepiece attach block 27 is attached to frame 15 and provides for attachment of a nosepiece 29. During use, air cylinders 19 are used to move motor assembly 17 relative to frame 15 from a rearward position to a forward position and back to the rearward position. FIGS. 1 and 2 show motor assembly 17 in the rearward position. The maximum force available from cylinders 19 is adjusted by controlling the air flow to cylinders 19.

Cylinders are positioned to ensure that substantially the same force is applied on opposite sides of the drilling axis, thus each rod 25 is preferably equidistant from the drilling axis. Though cylinders 19 are shown as each having a pair of rods 25 and pistons, cylinders 19 may each have only one rod and piston, cylinders 19 being located 180 degrees from each other. Also, three cylinders can be positioned 120 degrees apart to accomplish the same goal of balancing the forces around the drilling axis.

A main air-supply line (not shown) connects to a quick-disconnect 31 below frame 15. Air is routed from connector 31 through a push/pull on/off connector 33 and a motor air-supply line 34 to a motor 35 (FIGS. 3 and 4) within housing 13. A tube 37 (FIG. 3) routes air from connector 31 to the feed system for motor assembly 17. Shaft 39 of motor 35 extends forward through front attach block 21 and has a chuck 41 for attaching a drill bit. Shaft 39 is located equidistant between air-cylinder rods 25 on the left and air-cylinder rods 25 on the right. Furthermore, the axis of shaft 39 is equidistant from a plane passing through the upper-right and upper-left rods 25 and a plane passing through the lower-right and lower-left rods 25. Shaft 39 is thus centered in the array of air-cylinder rods 25.

A pair of hydraulic fluid restrictors or flow-restriction cylinders 43 are also carried within housing 13, and their pistons are connected by rods 45 to the forward end of frame 15. Cylinders 43 are located on each side of shaft 39 and are diametrically opposed to each other. Cylinders 43 provide an adjustable control of the forward feed movement of motor assembly 17 relative to frame 15 and caused by air cylinders 19. Each cylinder 43 provides a restriction to a flow of hydraulic fluid within the cylinder, creating a resistance to movement of motor assembly 17 relative to frame 15. Adjustment knobs 49 are used for regulating the feed rate of hydraulic cylinders 43 by changing the resistance created by cylinders 43.

A hand grip 47 is located on the vertical rear portion of frame 15 for holding drill 11. Two buttons 51, 53 are located above grip 47 for controlling the motion of motor assembly 17 within frame 15. Button 51 is a switch that starts the feed-forward process, whereas button 53 is a manual-return switch, allowing the user to manually cause the return of motor assembly 17.

An auto-return clamp 55 attaches to rods 25 of one air cylinder 19 and can be adjusted along the length of rods 25 to adjust for drilling depth. A pin 57 extends rearward from the upper portion of clamp 55 and through front attach block 21 for actuating an auto-return valve 59 (FIG. 4) located within housing 13. Clamp 55 and pin 57 remain stationary with respect to rods 25, and valve 59 remains stationary relative to air cylinders 19. As rods 25 move relative to cylinders 19, pin 57 moves relative to valve 59. When pin 57 contacts valve 59, motor assembly 17 is moved back to its rearward position.

Referring to FIG. 2, nosepiece 29 has a lug 61 adapted to engage a connector on a template for holding frame 15 of drill 11 stationary while attached to the template. Drilling lubricant can be fed through a connector 63 (FIG. 2) and line 65 (FIG. 1) near the front of drill 11. A tubular drill bit support 67 is integral with and extends forward from lug 61 for supporting the bit during operation.

Figure 3:
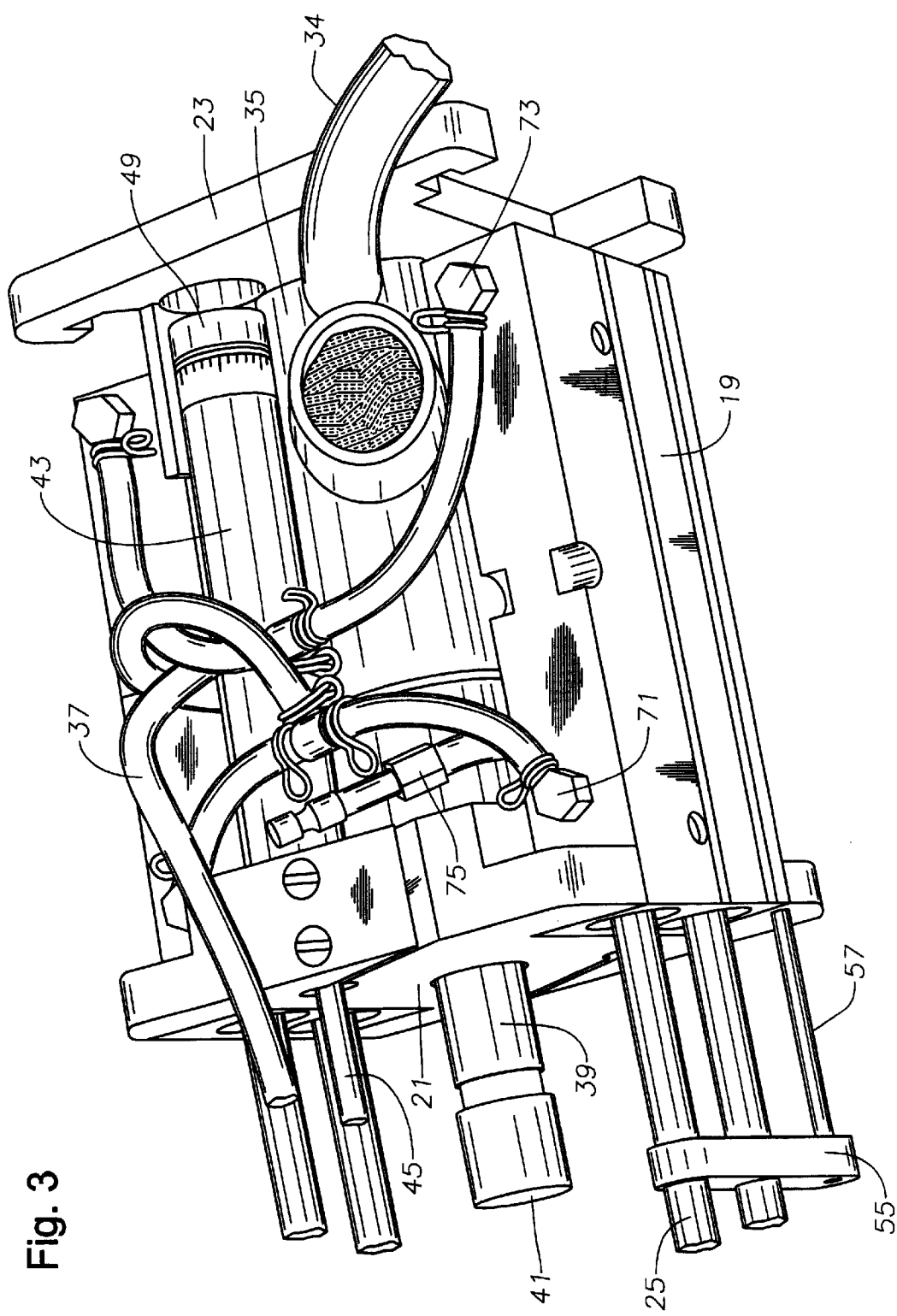
FIG. 3 is a perspective view of some of the internal components of the drill of FIG. 1.
Figure 4:
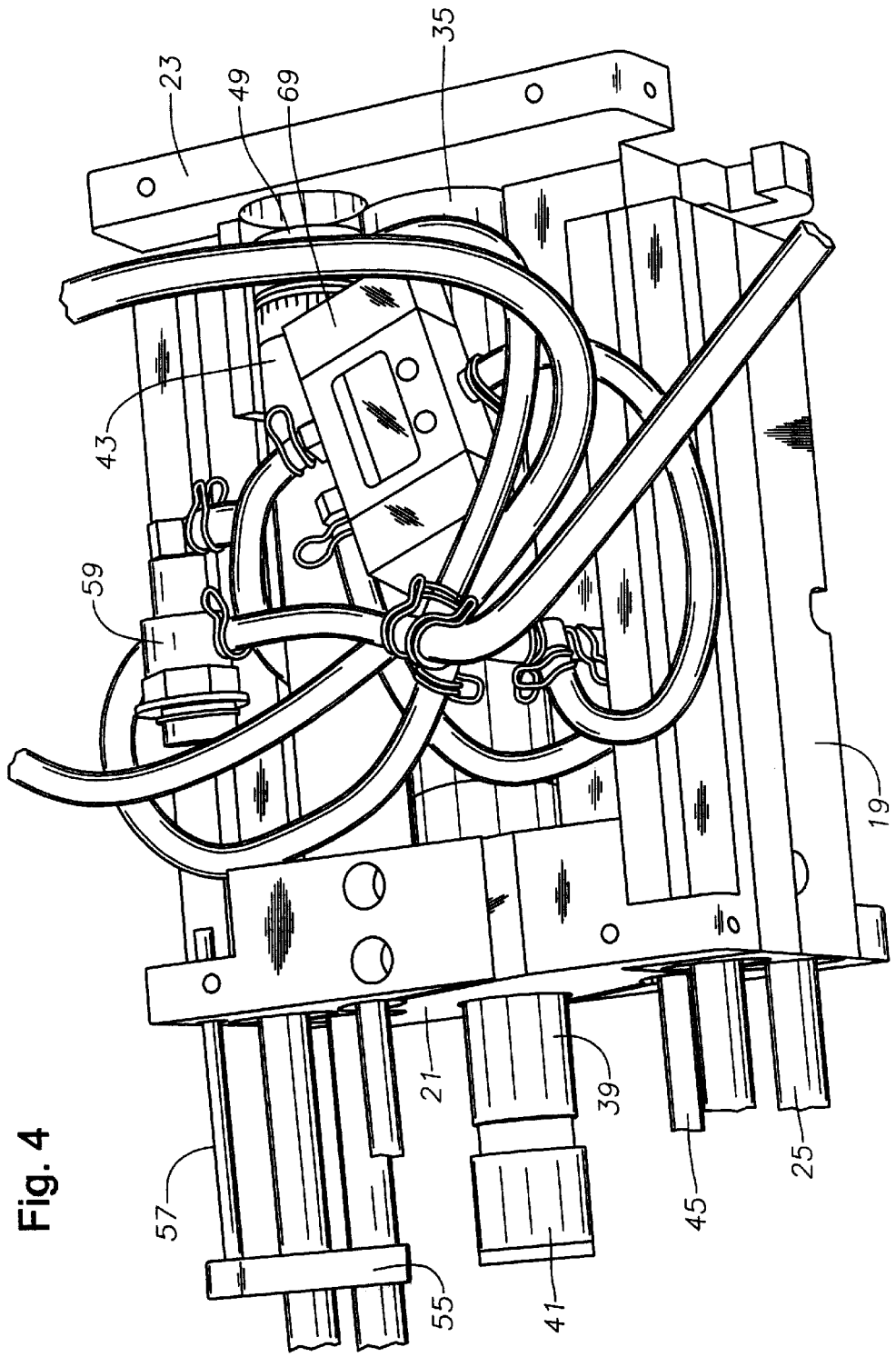
FIG. 4 is a second perspective view of some of the internal components of the drill of FIG. 1.

Referring to FIGS. 3 and 4, cylinders 19 are preferably rectangular and form the sides of a rectangular structure, the front and rear of the rectangular structure being attach blocks 21, 23. Rear attach block 23 is capable of sliding forward and rearward relative to cylinders 19 to accommodate motors 35 of various lengths. Tubing routes air to and from a 4-way valve 69 (FIG. 4) for controlling the airflow to cylinders 19. Air travels into feed-forward ports 71 (FIG. 3) for retracting rods 25 into air cylinders 19. This retraction causes motor assembly 17 (FIG. 1) to move forward within frame 15. Auto-return valve 59 (FIG. 4) is located on the top one of the air cylinders 19 and is actuated by auto-return pin 57 attached to clamp 55. As motor assembly 17 moves forward, auto-return pin 57 depresses an actuator on the forward end of auto-return valve 59, causing air to be routed to feed-return ports 73. This causes motor assembly 17 to return to the rearward position. Tubing runs from valve 69 to buttons 51, 53, allowing for user control over the operation of the feed system. A flow-control valve 75 is used to regulate the return rate of cylinder rods 25. Air is ported through flow control valve 75 by means of auto-return valve 59 or manual return button 53.

In operation, a template (not shown) is installed on a material to be drilled. A drill bit is connected to chuck 41 on shaft 39, and a main air-supply line is attached to disconnect 31. If desired, a lubricant line can be attached to connector 63 for delivering lubricant to the drill bit through line 65. The drill force is determined by the size of cylinders 19 the air pressure supplied to drill 11. Adjustment knobs 49 control the rate of advance by providing a variable resistance to the movement caused by air cylinders 19. The desired depth is set by adjusting clamp 55 and pin 57 along rods 25. Lug 61 on nosepiece 21 is locked into a corresponding connector on the template, and connector 33 is opened to allow air into line 34 and motor 35. Drill bit rotates, and the user actuates button 51 to start the feed system. Air travels into feed-forward ports 71, causing cylinders to retract relative to rods 25, rods 25 being rigidly fastened to frame 15. Motor assembly 17 moves forward in frame 15, and the drill bit is advanced toward the material. As motor assembly 17 advances, auto-return valve 59 is moved toward the rearward end of pin 57, which is stationary relative to rods 25, until pin 57 actuates valve 59. Air is routed though flow control valve 75 to feed-return ports 73, causing cylinders 19 to extend relative to rods 25 and causing motor assembly 17 to be moved rearward within frame 15 to withdraw the drill bit. The user may actuate button 53 to cause motor assembly 17 to return before pin 57 actuates auto-return valve 59.

One advantage to the invention is that the force for feeding the drill bit is distributed evenly around the bit, preventing an unopposed moment from being created. Also, use of air cylinders 19 and hydraulic restrictions allow a maximum feed-force to be set, preventing the feed system from over-forcing a dull bit into the material to be drilled, as happens with the prior-art mechanical fixed-feed-rate systems. If the bit becomes dull, the rate of penetration automatically declines because the force due to the air pressure does not change once set. The hydraulic restriction provides for reduced cycle time prior to the drill bit contacting the material and increased penetration rates while drilling in soft material.

While the invention has been shown in only one of its forms, it is not thus limited but is susceptible to various changes and modifications without departing from the spirit thereof.

I claim:

1. A drill, comprising:
   a frame having a longitudinal axis;
   a carriage mounted to the frame for movement along the axis;
   a motor having a chuck adapted to receive a drill bit for rotation therewith, the motor being carried on the carriage for movement relative to the frame;
   a plurality of pneumatic cylinders, each having a rod mounted between the carriage and the frame for moving the carriage relative to the frame, the cylinders being spaced in a concentric array about an axis of the chuck; and
   a pair of hydraulic fluid restrictors connected between the carriage and the frame on opposite sides of the axis of the chuck.

2. The apparatus of claim 1, further comprising:
   a grip attached to a rear portion of the frame rearward of the carriage for holding the drill.

3. A drill, comprising:

a motor adapted to receive a drill bit for rotation therewith, the motor being carried on a carriage and having a longitudinal axis;

a nosepiece adapted to connect to a guide template;

at least two pneumatic cylinders carried on the carriage and having rods connected to the nosepiece for moving the carriage longitudinally relative to the nosepiece between a rearward position and a forward position, the axis of the motor passing equidistant between the rods;

a pair of hydraulic restrictors, each having an adjustable means for varying the amount of restriction and connecting the nosepiece to the carriage for limiting the speed at which the cylinders move the carriage relative to the nosepiece, the hydraulic restrictors being mounted on opposite sides of the axis;

a perimeter frame attached to the nosepiece, the frame supporting the carriage and extending rearward beyond a rearward end of the carriage, the frame having upper and lower bands that extend generally parallel to the longitudinal axis;

a grip attached to the rear of the frame;

a valve connected to the pneumatic cylinders for controlling of motion of the carriage; and an actuator for engaging the valve at a selected point, causing the carriage to return to the rearward position.

4. The drill of claim 3, wherein:

the rods comprise at least two pairs of rods, each pair of rods being located on opposite sides of the axis of the motor.

5. The apparatus of claim 1, wherein:

each pneumatic cylinder has at least one extensible rod, at least three of the rods being stationarily mounted to the frame; and the carriage comprises at least one block mounted to the cylinders.

6. The apparatus of claim 1, further comprising:

a valve carried in the carriage and connected to the pneumatic cylinders for controlling of movement of the carriage; and an actuator carried by the frame, the valve moving with the carriage relative to the frame and engaging the actuator at a selected point, causing the carriage to automatically return to a rearward position.

7. The apparatus of claim 1, wherein:

each of the plurality of pneumatic cylinders has a pair of the rods, the pairs of rods being on opposite sides of the axis of the chuck from each other, planes defined by axes of the rods of each pair being parallel and equidistant from the axis of the chuck.

8. The apparatus of claim 1, further comprising:

a nosepiece mounted to a forward end of the frame and adapted to mount to a guide template.

9. A drill, comprising:

a motor adapted to receive a drill bit for rotation therewith, the motor being carried on a carriage and having a longitudinal axis;

a nosepiece adapted to connect to a guide template;

at least two fluid-operated cylinders carried on the carriage and having rods connected to the nosepiece for moving the carriage longitudinally relative to the nosepiece between a rearward position and a forward position, the axis of the motor passing equidistant between the rods;

at least one restrictor connecting the nosepiece to the carriage for limiting the speed at which the cylinders move the carriage relative to the nosepiece;

a perimeter frame attached to the nosepiece, the frame supporting the carriage and extending rearward beyond a rearward end of the carriage; and a grip attached to the rear of the frame for holding the drill.

10. The drill of claim 1, wherein:

the frame is a perimeter frame having upper and lower bands that extend from a nosepiece located forward of the carriage, the bands of the frame extending rearward generally parallel to the longitudinal axis and terminating rearward of the carriage.

11. The drill of claim 10, further comprising:

a grip attached to a rear portion of the frame rearward of the carriage for holding the drill.

12. The apparatus of claim 9, further comprising:

a valve mounted to the carriage and connected to the cylinders for controlling of motion of the carriage; and an actuator carried in the frame, the valve moving with the carriage relative to the frame and engaging the actuator at a selected point, causing the carriage to return to the rearward position.

13. A drill, comprising:

a motor adapted to receive a drill bit for rotation therewith, the motor being carried on a carriage and having a longitudinal axis;

a nosepiece adapted to connect to a guide template;

at least two fluid-operated cylinders carried on the carriage and having rods connected to the nosepiece for moving the carriage longitudinally relative to the nosepiece between a rearward position and a forward position, the axis of the motor passing equidistant between the cylinders;

at least one restrictor connecting the nosepiece to the carriage for limiting the speed at which the cylinders move the carriage relative to the nosepiece;

an auto-return valve mounted to the carriage and connected to the cylinders for returning the carriage to the rearward position;

a clamp releasably attached to the rod of one of the cylinders;

an actuating pin extending rearward from the clamp; and wherein the pin actuates the valve when the valve is moved forward into engagement with the pin, causing the carriage to automatically return to the rearward position.

14. The drill of claim 9, wherein:

restrictor is a hydraulic restrictor having an adjustable means for varying the amount of restriction.

15. The drill of claim 9, wherein:

the rods comprise at least two pairs of the rods, the pairs of the rods being located on opposite sides of the axis of the motor.

16. The drill of claim 3, further comprising:

a grip attached to the frame for holding the drill.

* * * * *